(12) United States Patent
Li et al.

(10) Patent No.: US 10,418,619 B2
(45) Date of Patent: *Sep. 17, 2019

(54) TOP COVER OF POWER BATTERY AND POWER BATTERY

(71) Applicant: Contemporary Amperex Technology Co., Limited, Ningde, Fujian Province (CN)

(72) Inventors: Quankun Li, Ningde (CN); Jian Guo, Ningde (CN); Lingbo Zhu, Ningde (CN); Pinghua Deng, Ningde (CN); Peng Wang, Ningde (CN); Kai Wu, Ningde (CN)

(73) Assignee: CONTEMPORARY AMPEREX TECHNOLOGY CO., LIMITED, Ningde, Fujian Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/485,775

(22) Filed: Apr. 12, 2017

(65) Prior Publication Data

US 2017/0352861 A1 Dec. 7, 2017

(30) Foreign Application Priority Data

Jun. 7, 2016 (CN) .......................... 2016 1 0399622

(51) Int. Cl.
*H01M 2/34* (2006.01)
*H01M 2/04* (2006.01)
*H01M 2/26* (2006.01)

(52) U.S. Cl.
CPC .......... *H01M 2/345* (2013.01); *H01M 2/043* (2013.01); *H01M 2/26* (2013.01); *H01M 2200/20* (2013.01); *H01M 2220/20* (2013.01)

(58) Field of Classification Search
CPC .. H01M 2/345; H01M 2/043; H01M 2220/20; H01M 2200/20; H01M 2/26
See application file for complete search history.

(56) References Cited

U.S. PATENT DOCUMENTS 6,210,824 B1 * 4/2001 Sullivan .............. H01M 2/1241
429/53
8,435,659 B2 5/2013 Byun et al.
(Continued)

FOREIGN PATENT DOCUMENTS

CN 201450037 U 5/2010
CN 201508864 6/2010
(Continued)

OTHER PUBLICATIONS

JP Office Action dated Jun. 20 Heisei 20 for corresponding JP Patent Application No. 2016-159533.
(Continued)

*Primary Examiner* — Edu E. Enin-Okut
*Assistant Examiner* — Kwang Han
(74) *Attorney, Agent, or Firm* — Tarolli, Sundheim, Covell & Tummino LLP

(57) ABSTRACT

The present application provides a top cover of a power battery and the power battery. The top cover of the power battery includes a first electrode unit and a second electrode unit, the second electrode unit includes a deformable plate, an insulation piece and a conductive plate, the top cover plate is provided with a deformable plate connecting hole, the deformable plate seals the deformable plate connecting hole, the insulation piece is located underneath the top cover plate, the insulation piece is connected with the top cover plate, the conductive plate is insulated from and fixed with the top cover plate through the insulation piece and is electrically connected with the deformable plate. The power battery includes the above top cover of the power battery.

(Continued)

The power battery provided by the present application can effectively prevent breaking, losing efficacy or deformation of the conductive plate during using process.

18 Claims, 7 Drawing Sheets

(56) References Cited

U.S. PATENT DOCUMENTS

| | | | |
|---|---|---|---|
| 9,741,994 B2 * | 8/2017 | Urano | H01M 2/06 |
| 2014/0038001 A1 | 2/2014 | Cai Rulai et al. | |

FOREIGN PATENT DOCUMENTS

| | | |
|---|---|---|
| CN | 202094198 U | 12/2011 |
| CN | 203631651 U | 6/2014 |
| CN | 205666262 U | 10/2016 |
| EP | 1921692 A1 | 5/2008 |
| JP | 5415413 B2 | 2/2014 |
| WO | 2010088332 | 8/2010 |

OTHER PUBLICATIONS

Chinese Office Action corresponding to Chinese Application Serial No. 201610399622.5, pp. 1-16.
European Search Report corresponding to European Application No. EP17151088.6, dated Feb. 23, 2017, 9 pages.

* cited by examiner

TOP COVER OF POWER BATTERY AND POWER BATTERY

CROSS-REFERENCE TO RELATED APPLICATIONS

This application claims the priority to and the benefit of Chinese Patent Application No. 2016103996225 filed on Jun. 7, 2016, the content of which is incorporated herein by reference in its entirety.

TECHNICAL FIELD

The present application relates to the field of energy storage device and, particularly, relates to a top cover of a power battery and the power battery.

BACKGROUND

In order to solve the over-charging problem of the EV shell battery, a general solution adopted in the industry is to cut off the main circuit before the cell loses efficacy, so as to prevent the battery from being charged continuously thereby ensuring safety of the battery.

At present, for a square shaped shell battery, a current interrupting device (CID) may be adopted. That is, the positive electrode main circuit includes an air pressure deformable plate and a conductive plate which is integrated with the CID as a whole. The periphery of the conductive plate is connected with an electrode tab of bare cell through welding, the CID portion of the conductive plate is connected with the deformable plate as a whole through welding, and the deformable plate is connected with a positive electrode column through welding so as to conduct a current to a positive electrode terminal.

When a battery is over charged, the internal air pressure is increased, the deformable plate is turned thus tearing the CID, so that the deformable plate is cut off from the conductive plate.

Theoretically, as long as a certain gap exists between the conductive plate and the formable plate or the positive terminal connected with the deformable plate, the main circuit can be cut off after the CID is torn. However, as mentioned above, the conductive plate is integrated with the CID as a whole, and is then fixed with the deformable plate through welding, and the bottom periphery of the conductive plate needs to be welded with the electrode tab of bare cell.

As we known, a certain air pressure is needed to push the deformable plate to tear the CID, both the deformable plate and the CID cannot be made too strong. Relatively speaking, it is preferred to be a little bit weaker. Thus, the conductive plate integrated with the CID as a whole is connected with the deformable plate at the top, and is connected with the electrode tab of bare cell at the bottom, if there is no other component for auxiliary fixing, it is easy to be broken and lose efficacy during the process of normal assembling and using, or the conductive plate is conductively connected with the deformable plate or the top cover plate after being deformed.

SUMMARY

The present application provides a top cover of a power battery and a power battery, which can solve the above problems.

A first aspect of the present application provides a top cover of a power battery including a top cover plate, a first electrode unit and a second electrode unit, the first electrode unit includes a deformable plate, an insulation piece and a conductive plate, the top cover plate is provided with a deformable plate connecting hole, the deformable plate seals the deformable plate connecting hole, the insulation piece is located underneath the top cover plate, the insulation piece is connected with the top cover plate, the conductive plate is insulated from and fixed with the top cover plate through the insulation piece and is electrically connected with the deformable plate, the deformable plate turns and cuts off an electrical connection with the conductive plate when an internal pressure of the power battery exceeds a reference pressure.

Preferably, the insulation piece is adhered and fixed with the top cover plate.

Preferably, the first electrode unit further includes a connecting piece, the insulation piece is provided with a connecting piece fitting portion and a conductive plate connecting portion, the connecting piece is connected with the top cover plate, and is cooperatively connected with the connecting piece fitting portion, so as to fix the insulation piece, the conductive plate is fixed through the conductive plate connecting portion.

Preferably, the connecting piece includes a top cover plate connecting portion and an insulation piece connecting portion, the top cover plate connecting portion is connected with the top cover plate, the insulation piece connecting portion is cooperatively connected with the connecting piece fitting portion.

Preferably, the connecting piece fitting portion is an inserting slot, the inserting slot extends along a thickness direction perpendicular to the top cover plate, the insulation piece connecting portion is an inserting block, the inserting block is inserted into the inserting slot.

Preferably, a plurality of connecting piece fitting portions are defined, which surround an edge of the insulation piece or are symmetrically provided thereat, each of the inserting slot is cooperated with at least one connecting piece.

Preferably, the insulation piece connecting portion is provided at a side of the top cover plate connecting portion.

Preferably, the insulation piece is further provided with an assembling hole, the connecting piece fitting portion is provided on an inner wall of the assembling hole, the connecting piece is arranged in the assembling hole.

Preferably, the insulation piece connecting portion is provided at an edge of the top cover plate connecting portion.

Preferably, the connecting piece fitting portion is symmetrically provided at both sides of the assembling hole, the insulation piece connecting portion is symmetrically provided at both sides of the top cover plate connecting portion.

Preferably, the connecting piece fitting portion is provided to surround the assembling hole, the insulation piece connecting portion is provided to surround the top cover plate connecting portion.

Preferably, an upper surface of the top cover plate connecting portion is aligned with an upper surface of the insulation piece, the top cover plate connecting portion is welded with a lower surface of the top cover plate.

Preferably, the top cover plate is provided with a fixing hole, the connecting piece is cooperatively fixed and connected with the fixing hole.

Preferably, the fixing hole is a though hole.

Preferably, the fixing hole is a ladder hole with a top diameter larger than a bottom diameter, the connecting piece is clamped and cooperated with the fixing hole.

Preferably, the fixing hole is a blind hole provided at a lower surface of the top cover plate.

Preferably, the fixing hole is welded and fixed with the connecting piece.

Preferably, the conductive plate connecting portion is a clamping slot, an edge of the conductive plate is clamped in the clamping slot.

A second aspect of the present application provides a power battery, including the above top cover plate of the power battery.

The technical solution provided by the present application can reach the following beneficial effect:

The power battery provided by the present application can effectively prevent breaking, losing efficacy or deformation of the conductive plate during using process by adopting an insulation piece to firmly fix the conductive plate on the top cover plate.

It should be understood that, the above general description and the following detailed description are just exemplary, which cannot limit the present application.

BRIEF DESCRIPTION OF DRAWINGS

FIG. 13 is adopted.

REFERENCE SIGNS

Figure 1:
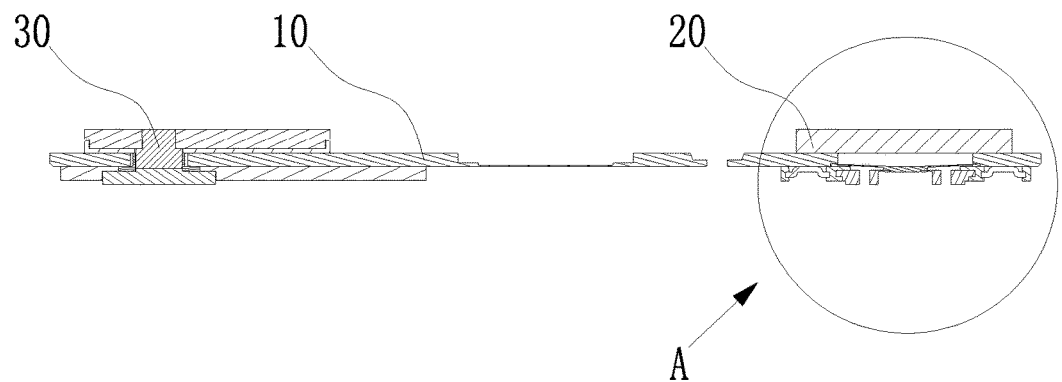
FIG. 1 is a side sectional diagram of an integral top cover of a power battery according to an embodiment of the present application.

10—top cover plate;
100—deformable plate connecting hole;
102—fixing hole;
20—first electrode unit;
200—insulation piece;
200a—connecting piece fitting portion;
200b—conductive plate connecting portion;
200c—assembling hole;
202—conductive plate;
204—deformable plate;
206—connecting piece;
206a—top cover plate connecting portion;
206b—insulation piece connecting portion;
30—second electrode unit.

These drawings are incorporated into the specification and constitute as a part of the specification, which show embodiments of the present application, and are used to illustrate the principle of the present application together with the specification.

DESCRIPTION OF EMBODIMENTS

The present application will be described in further detail through specific embodiments and the accompany drawings. The "front", "back", "left", "right", "up", "down" are referring to the placing states of a top cover of a power battery and the power battery in the drawings.

As shown in FIG. 1, an embodiment of the present application provides a top cover of a power battery, including a top cover plate 10, a first electrode unit 20 and a second electrode unit 30. The second electrode unit 30 is electrically insulated from the top cover plate 10. The first electrode unit 20 includes an insulation piece 200, a conductive plate 202, and a deformable plate 204. In the present embodiment, a deformable plate connecting hole 100 is provided on the top cover plate 10, the deformable plate 204 seals and fixes the deformable plate connecting hole 100, the insulation piece 200 is located underneath the top cover plate 10, the conductive plate 202 is integrated with a CID, and is electrically connected with the deformable plate 204, the electrical connection manner is that the middle portion of the deformable plate 204 is fixedly connected with the CID on the conductive plate 202 through welding or other manners.

The deformable plate 204 can turn and separate from electrical connection status with the conductive plate 202 when the pressure in the interior of the power battery exceeds a reference pressure.

The deformable plate 204 seals the deformable plate connecting hole 100, the edge of the deformable plate 204 can be welded at the top or bottom of the deformable plate connecting hole 100 (as shown in FIG. 1), as long as the deformable plate connecting hole 100 can be sealed. Absolutely, the deformable plate can also be integrated with the top cover plate as a whole, that is, the top cover plate punches a deformable plate at the deformable plate connecting hole, the deformable plate can be located at the top or bottom of the deformable plate connecting hole 100.

In order to fix the conductive plate 202 firmly, and prevent the conductive plate 202 from breaking, losing efficacy or deformation during normal assembling and using process, in the present embodiment, the conductive plate 202 is fixed through the insulation piece 200, then the insulation piece 200 is fixed with the top cover plate 10.

Figure 2:
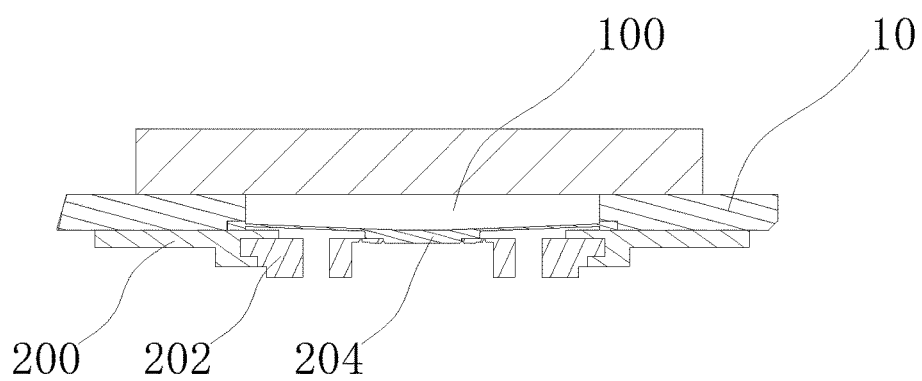
FIG. 2 is a partial enlarged diagram of part A of the top cover of the power battery in FIG. 1, of which an insulation piece is directly adhered to a top cover plate, according to an embodiment of the present application.

Various fixing manners can be adopted between the insulation piece 200 and the top cover plate 10, for example, the insulation piece 200 can be adhered and thus fixed with the top cover plate 10 directly (referring to FIG. 2).

However, in order to improve the connection strength between the insulation piece 200 and the top cover plate 10, as shown from FIG. 3 to FIG. 14, the insulation piece 200 in the present embodiment is provided with a connecting piece fitting portion 200a and a conductive plate connecting portion 200b, and is provided with a connecting piece 206. The connecting piece 206 is connected with the top cover plate 10, and is cooperatively connected with the connecting piece fitting portion 200a, so as to fix the insulation piece 200, the conductive plate 202 is fixed through the conductive plate connecting portion 200b.

The connecting piece 206 itself can be firmly fixed on the top cover plate 10 through the clamping or welding manner and the like, at the same time, the connecting piece 206 firmly fixes the insulation piece 200 through the cooperation connection with the connecting piece fitting portion 200a. At last, the conductive plate 202 is connected and fixed with the insulation piece 200, thereby achieving the auxiliary firmly fixing of the conductive plate 202.

In the present embodiment, for convenient connection, the connecting piece 206 can include two portions, that is, a top cover plate connecting portion 206a and an insulation piece connecting portion 206b. The top cover plate connecting portion 206a and the insulation piece connecting portion 206b can be fixedly connected or integrated as a whole. The top cover plate connecting portion 206a is configured to be connected with the top cover plate 10.

Figure 3:
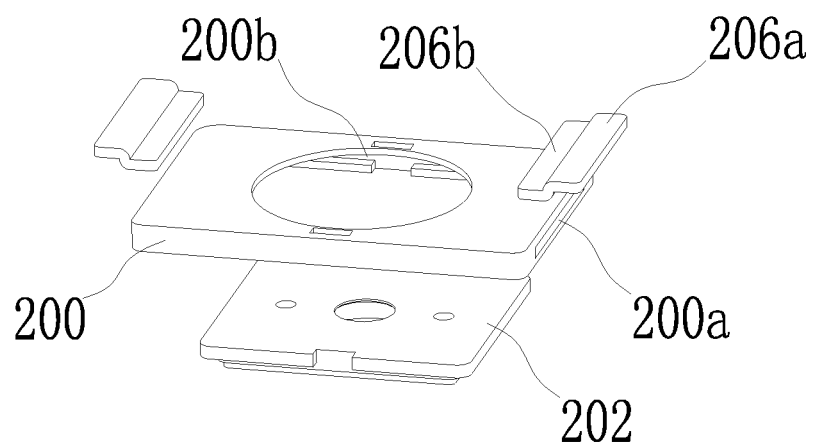
FIG. 3 is an explosive view of cooperation relationship of an insulation piece with an inserting slot arranged at an edge thereof and a conductive plate as well as a connecting piece according to an embodiment of the present application.
Figure 4:
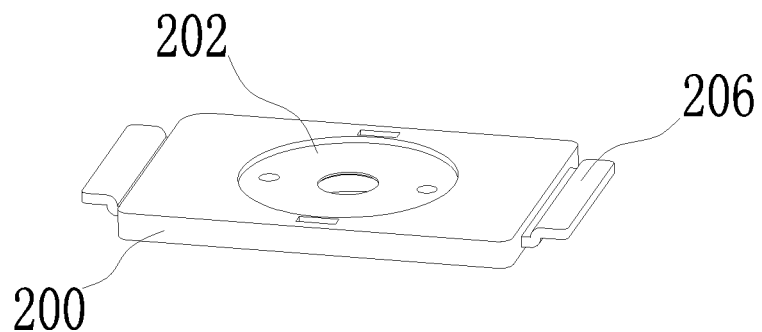
FIG. 4 is an assembling structural diagram of FIG. 3.
Figure 5:
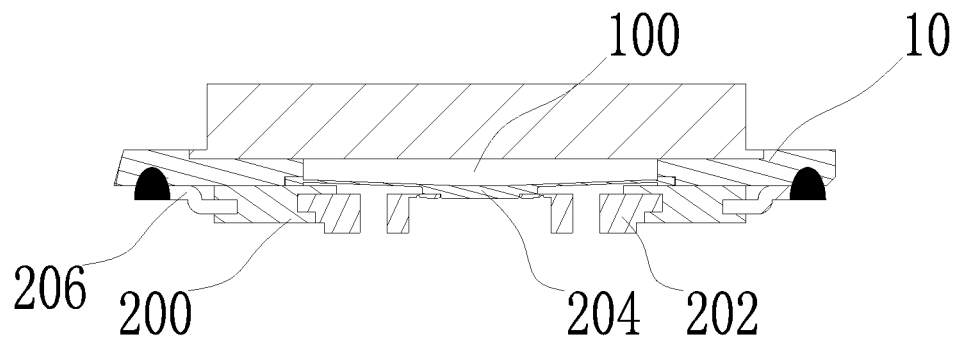
FIG. 5 is a partial enlarged diagram of part A of the top cover of the power battery in FIG. 1, of which the assembling structure of FIG. 4 is adopted.

As shown from FIG. 3 to FIG. 5 and from FIG. 10 to FIG. 14, the top cover plate connecting portion 206a can be directly welded with the lower surface of the top cover plate 10, thus can avoid changing the structure of the top cover plate 10. In order to improve connection strength, the upper surface of the top cover plate connecting portion 206a can be arranged to be a plane shape, and fitted with the lower surface of the top cover plate 10, thereby improving the connection strength effectively through the manner of enlarging the connecting area. In order to achieve tightly contact between the insulation piece 200 and the top cover plate 10, the upper surface of the top cover plate connecting portion 206a is preferred to be aligned with the upper surface of the insulation piece 200.

In the present embodiment, the top cover plate 10 can be connected with the top cover plate connecting portion 206a adopting other manners. Specifically, a fixing hole 102 can be provided on the top cover plate 10, the top cover plate connecting portion 206a is cooperatively fixed and connected with the fixing hole 102. In order to improve the connection strength between them, it is preferred to adopt the welding manner for fixing.

The fixing hole 102 can adopt a through hole (referring to FIG. 6 and FIG. 9), and can also adopt a blind hole (referring to FIG. 7) provided at the lower surface of the top cover plate 10. Adopting a through hole can facilitate welding of the top cover plate 10 with the top cover plate connecting portion 206a on the top of the top cover plate 10, welding slag and welding line will not be left in the interior of the power battery, and therefore bringing less influence to the performance of the power battery. Further, the through hole can be provided to be a ladder hole with a top diameter larger than a bottom diameter, the top cover plate connecting portion 206a and the fixing hole 102 are clamped, which can also improve sealing performance of the fixing hole, meanwhile preventing the top cover plate connecting portion 206a from falling into the interior of the power battery. Adopting a blind hole can generate a larger pushing force to the top cover plate connecting portion 206a by the top cover plate 10 while connecting the insulation piece connecting portion 206b with the connecting piece fitting portion 200a, so as to achieve a firmer connection between the insulation piece connecting portion 206b and the connecting piece fitting portion 200a.

As long as the connecting piece fitting portion 200a in the present embodiment can be dragged by the insulation piece connecting portion 206b, so as to prevent the insulation piece 200 from falling down. For example, the insulation piece connecting portion 206b can be provided at the periphery or two symmetrical sides of the insulation piece 200 (referring to FIG. 8). A preferred manner is to adopt an inserting slot, the inserting slot extends along the thickness direction perpendicular to the top cover plate 10, the insulation piece connecting portion 206b is an inserting block, the inserting block is inserted into the inserting slot, so as to limit movement of the inserting block in multiple directions, and thereby improving the fixing effect. When adopting the inserting slot structure, a plate with a uniform thickness can be adopted and then bended into portions with different heights, so as to form the top cover plate connecting portion 206a and the insulation piece connecting portion 206b, respectively.

There are various manners for arranging the inserting slot, one of them is that, the inserting slots are provided at the edge of the insulation piece 200, at this time, the number of the inserting slot is more than one, which are provided to surround at the edge of the insulation piece 200 or symmetrically provided thereat (referring to FIGS. 3-5), each inserting slot is cooperated with at least one connecting piece 206. Through this manner, the insulation piece 200 can be surrounded in the middle by arranging multiple connecting pieces 206 at the periphery thereof, by adopting these connecting pieces 206 and the interaction of the inserting slots, movement of the insulation piece 200 can be limited in all directions, thereby improving stability. At this time, the insulation piece connecting portion 206b on the connecting piece 206 is preferred to be provided at a side of the top cover plate connecting portion 206a, the top cover plate connecting portion 206a being located at the outside position after the insulation piece connecting portion 206b is inserted into the inserting slot.

Figure 9:
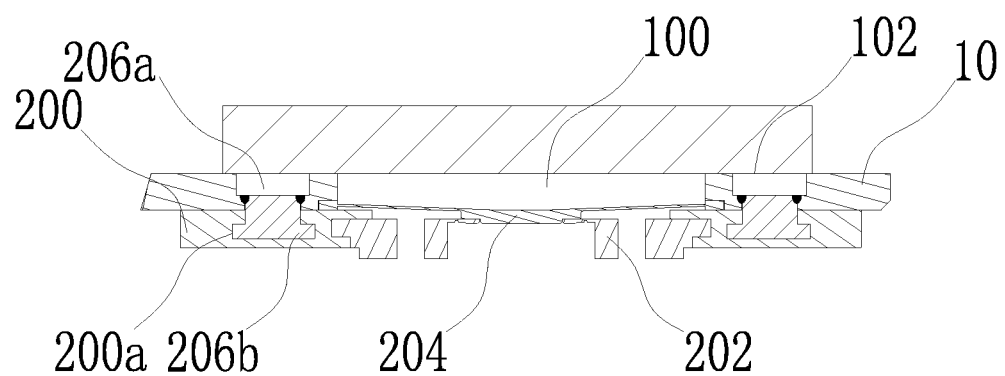
FIG. 9 is a partial enlarged diagram of part A of the top cover of the power battery in FIG. 1, of which a connecting piece fitting portion is a groove provided in the interior of an insulation piece, according to an embodiment of the present application.
Figure 10:
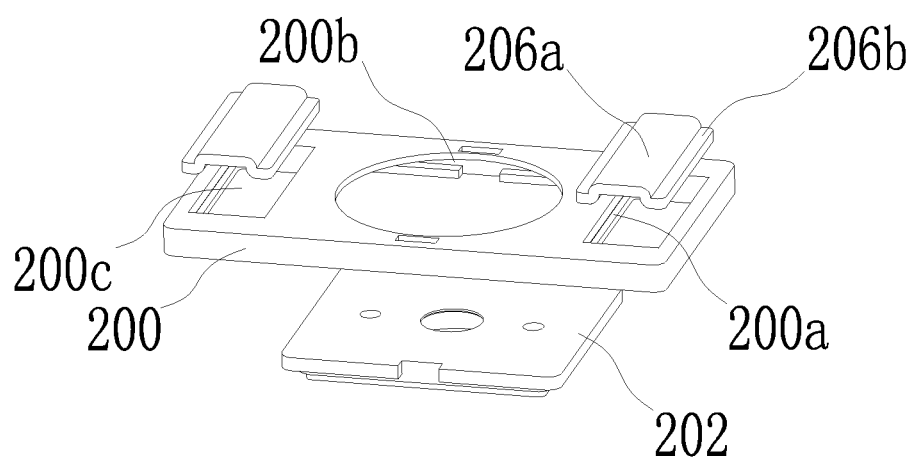
FIG. 10 is an explosive view of cooperation relationship of an insulation piece with an inserting slot provided at two symmetrical sides of an assembling hole and a conductive plate as well as a connecting piece according to an embodiment of the present application.
Figure 11:
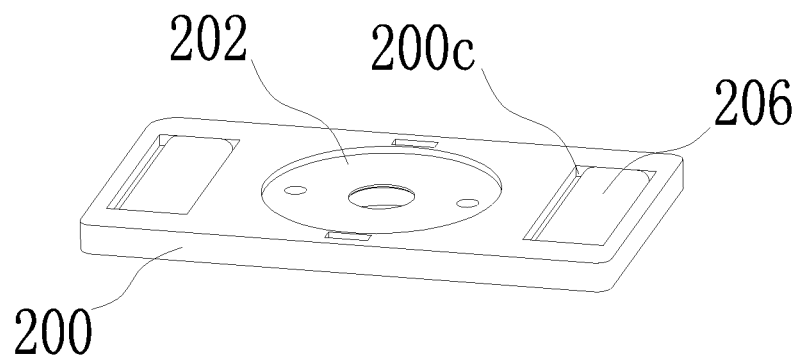
FIG. 11 is an assembling structural diagram of FIG. 10.
Figure 12:
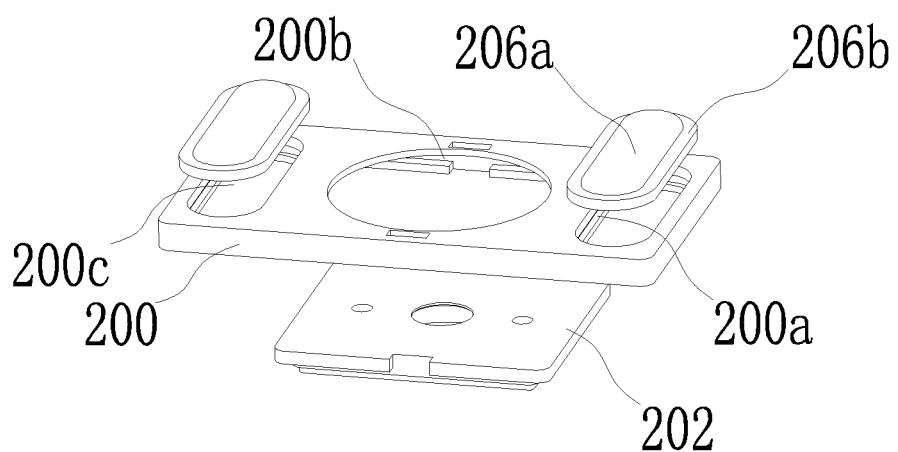
FIG. 12 is an explosive view of cooperation relationship of an insulation piece with an inserting slot provided at periphery of an assembling hole and a conductive plate as well as a connecting piece according to an embodiment of the present application.
Figure 13:
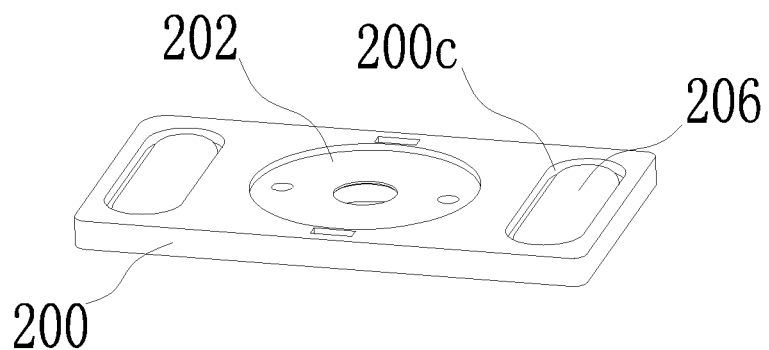
FIG. 13 is an assembling structural diagram of FIG. 12.
Figure 14:
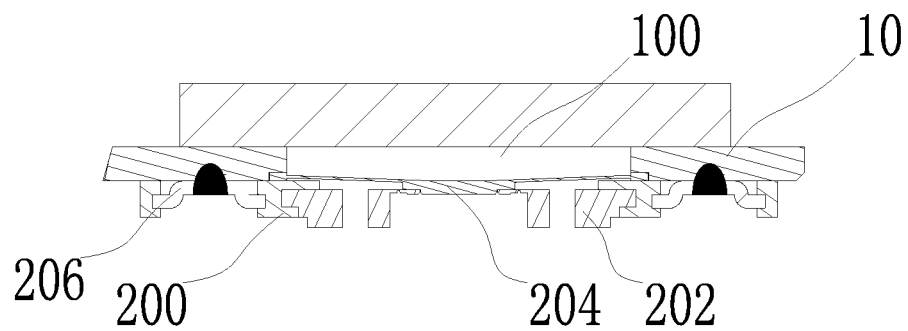
FIG. 14 is a partial enlarged diagram of part A of the top cover of the power battery in FIG. 1, of which the assembling structure of FIG. 11

As shown in FIG. 9, the inserting slot can also be provided in the interior of the insulation piece 200, the insulation piece connecting portion 206b can be inserted from an end of the inserting slot, and then fixed.

As shown from FIG. 10 to FIG. 14, the inserting slot can be provided by adopting another manner. An assembling hole 200c is provided on the insulation piece 200, the inserting slot is provided on the inner wall of the assembling hole 200c. Thus, the connecting piece 206 is located in the assembling hole 200c, which performs better invisibility, at the same time, more internal space of the power battery can be saved. However, when adopting this manner, it should be noted that the conductive plate connecting portion 200b cannot be connected with the assembling hole 200c, so as to prevent the conductive plate 202 from being electrically connected with the top cover plate 10 through the connecting piece 206. Since the connecting piece 206 is arranged in the assembling hole 200c, therefore, the insulation piece connecting portion 206b is provided at the edge of the top cover plate connecting portion 206a so as to be inserted into the inserting slot. At this time, the inserting slot can be provided only at two symmetrical sides of the assembling hole 200c (referring to FIG. 10 and FIG. 11), and can also be provided to surround the periphery of the assembling hole 200c (referring to FIG. 12 and FIG. 13), the position of the insulation piece connecting portion 206b with respect to the top cover plate connecting portion 206a is corresponding to the position of the inserting slot, so as to be inserted into the inserting slot.

Figure 6:
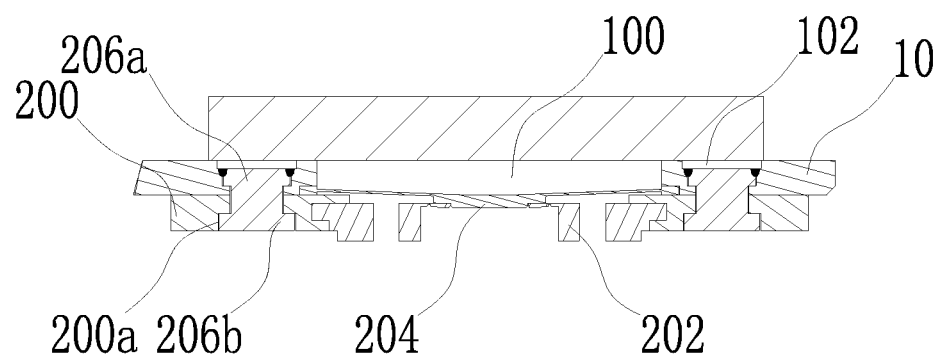
FIG. 6 is a partial enlarged diagram of part A of the top cover of the power battery in FIG. 1, of which a top cover plate is provided with a through hole type fixing hole, according to an embodiment of the present application.
Figure 7:
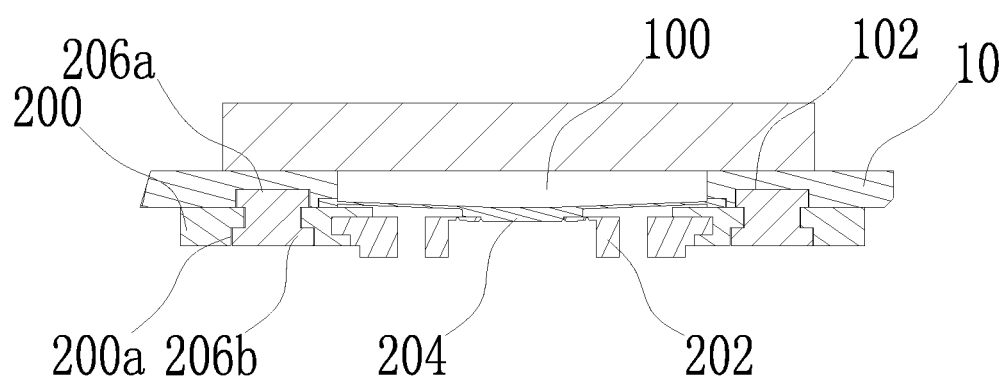
FIG. 7 is a partial enlarged diagram of part A of the top cover of the power battery in FIG. 1, of which a top cover plate is provided with a blind hole type fixing hole, according to an embodiment of the present application.
Figure 8:
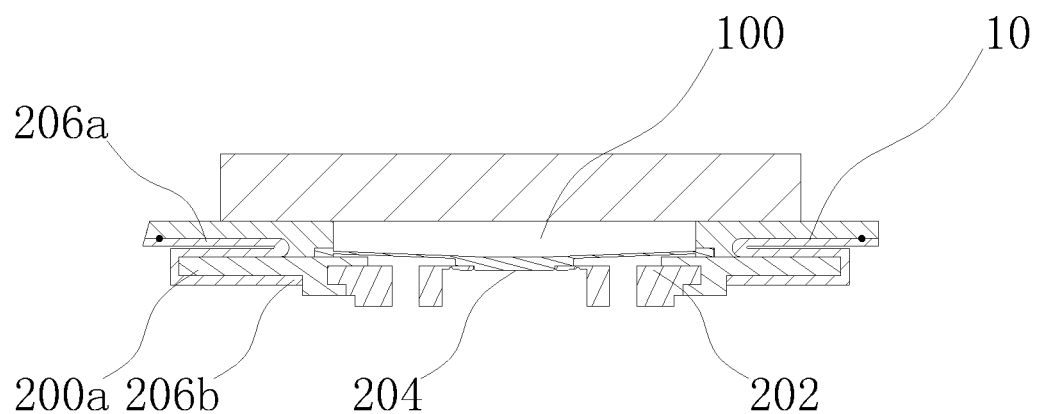
FIG. 8 is a partial enlarged diagram of part A of the top cover of the power battery in FIG. 1, of which a connecting piece is arranged at an edge thereof, according to an embodiment of the present application.

Similarly, as shown in FIG. 6 and FIG. 7, in the present embodiment, the connecting piece fitting portion 200a can also adopt a through hole, the through hole can be clamped after the top cover plate connecting portion 206a passes through the connecting piece fitting portion 200a, so as to prevent the insulation piece 200 from moving. In order to reduce the occupied internal space of the power battery, the connecting piece fitting portion 200a can adopt a ladder hole with a top diameter smaller than a bottom diameter, thus, the portion of the top cover plate connecting portion 206a which is used to clamp the connecting piece fitting portion 200a can be located in the interior of the insulation piece 200, which will not protrude from the insulation piece 200 to occupy more space of the power battery. In the above situation, the top cover plate connecting portion 206a can adopt a rivet, after the rivet passes through the connecting piece fitting portion 200a, the head of the rivet will be riveted to be flat through a riveting manner, so as to clamp the connecting piece fitting portion 200a.

In the present embodiment, the conductive plate 202 is insulated form and fixed with the top cover plate 10 through the conductive plate connecting portion 200b. For convenient connection, the conductive plate connecting portion 200b can be provided as a clamping slot, the edge of the conductive plate 202 can be clamped in the clamping slot. Thus, the conductive plate 202 can be firmly fixed on the top cover plate 10 through the insulation piece, so as to prevent the conductive plate 202 from breaking and losing efficacy caused by self-displacement during normal assembling and using process.

The present embodiment also provides a power battery, by adopting the top cover of the power battery, malfunctions caused by breaking, losing efficacy or deformation of the conductive plate during using process can be effectively prevented, at the same time, a larger interior space can be provided.

The above are just the preferred embodiments of the present application, which will not limit the present application, for those skilled in the art, the present application can have various modifications and variations. Any modifications, equivalent replacements and improvements made within the spirit and principle of the present application shall fall in the protection scope of the present application.

What is claimed is:

1. A top cover of a power battery, characterized in that, comprising a top cover plate, a first electrode unit and a second electrode unit, the first electrode unit comprises a deformable plate, an insulation piece and a conductive plate, the top cover plate is provided with a deformable plate connecting hole, the deformable plate seals the deformable plate connecting hole, the insulation piece is located underneath the top cover plate, the insulation piece is connected with the top cover plate, the conductive plate is insulated from and fixed with the top cover plate through the insulation piece and is electrically connected with the deformable plate, the deformable plate configured to turns and cuts off an electrical connection with the conductive plate when an internal pressure of the power battery exceeds a reference pressure, the insulation piece is provided with a conductive plate connecting portion, and the conductive plate is fixed through the conductive plate connecting portion, and the conductive plate connecting portion is a clamping slot, and an edge of the conductive plate is clamped in the clamping slot.

2. The top cover of the power battery according to claim 1, characterized in that, the insulation piece is adhered and fixed with the top cover plate.

3. The top cover of the power battery according to claim 1, characterized in that, the first electrode unit further comprises a connecting piece, the insulation piece is provided with a connecting piece fitting portion, the connecting piece is connected with the top cover plate, and is cooperatively connected with the connecting piece fitting portion, so as to fix the insulation piece.

4. The top cover of the power battery according to claim 3, characterized in that, the connecting piece comprises a top cover plate connecting portion and an insulation piece connecting portion, the top cover plate connecting portion is connected with the top cover plate, the insulation piece connecting portion is cooperatively connected with the connecting piece fitting portion.

5. The top cover of the power battery according to claim 4, characterized in that, the connecting piece fitting portion is an inserting slot, the inserting slot extends along a thickness direction perpendicular to the top cover plate, the insulation piece connecting portion is an inserting block, the inserting block is inserted into the inserting slot.

6. The top cover of the power battery according to claim 5, characterized in that, a plurality of connecting piece fitting portions are defined, which surround an edge of the insulation piece or are symmetrically provided thereat, each of the inserting slot is cooperated with at least one connecting piece.

7. The top cover of the power battery according to claim 6, characterized in that, the insulation piece connecting portion is provided at a side of the top cover plate connecting portion.

8. The top cover of the power battery according to claim 5, characterized in that, the insulation piece is further provided with an assembling hole, the connecting piece fitting portion is provided on an inner wall of the assembling hole, the connecting piece is arranged in the assembling hole.

9. The top cover of the power battery according to claim 8, characterized in that, the insulation piece connecting portion is provided at an edge of the top cover plate connecting portion.

10. The top cover of the power battery according to claim 9, characterized in that, the connecting piece fitting portion is symmetrically provided at both sides of the assembling hole, the insulation piece connecting portion is symmetrically provided at both sides of the top cover plate connecting portion.

11. The top cover of the power battery according to claim 9, characterized in that, the connecting piece fitting portion is provided to surround the assembling hole, the insulation piece connecting portion is provided to surround the top cover plate connecting portion.

12. The top cover of the power battery according to claim 6, characterized in that, an upper surface of the top cover plate connecting portion is aligned with an upper surface of the insulation piece, the top cover plate connecting portion is welded with a lower surface of the top cover plate.

13. The top cover of the power battery according to claim 4, characterized in that, the top cover plate is provided with a fixing hole, the connecting piece is cooperatively fixed and connected with the fixing hole.

14. The top cover of the power battery according to claim 13, characterized in that, the fixing hole is a through hole.

15. The top cover of the power battery according to claim 14, characterized in that, the fixing hole is a ladder hole with a top diameter larger than a bottom diameter, the connecting piece is clamped and cooperated with the fixing hole.

16. The top cover of the power battery according to claim 13, characterized in that, the fixing hole is a blind hole provided at a lower surface of the top cover plate.

17. The top cover of the power battery according to claim 13, characterized in that, the fixing hole is welded and fixed with the connecting piece.

18. A power battery, characterized in that, comprising the top cover plate of the power battery according to claim 1.

* * * * *